(12) United States Patent
Lee

(10) Patent No.: US 7,443,616 B2
(45) Date of Patent: Oct. 28, 2008

(54) OPTICAL LENS AND CAMERA MODULE EMPLOYING THE SAME

(75) Inventor: Chun-Yu Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 82 days.

(21) Appl. No.: 11/448,227

(22) Filed: Jun. 7, 2006

(65) Prior Publication Data
US 2007/0058270 A1    Mar. 15, 2007

(30) Foreign Application Priority Data
Sep. 9, 2005    (CN) ........................ 200510037237.8

(51) Int. Cl.
*G02B 7/02*    (2006.01)

(52) U.S. Cl. ........................ 359/811; 359/813; 359/819

(58) Field of Classification Search ................. 359/819, 359/811, 813, 821–830
See application file for complete search history.

(56) References Cited

U.S. PATENT DOCUMENTS 5,339,123 A * 8/1994 Soshi et al. .................. 396/318
6,104,553 A * 8/2000 Nagahara ..................... 359/793

* cited by examiner

*Primary Examiner*—Timothy J Thompson
(74) *Attorney, Agent, or Firm*—Andrew C. Cheng

(57) ABSTRACT

An exemplary optical lens (24) is provided for a camera module (20). The optical lens includes a lens portion (242) and a mounting portion (243). The lens portion is located at a center of the mounting portion. The lens portion is configured for refracting a first portion of image light incident on the lens portion. The mounting portion has a light deflecting part (246). The light deflecting part is formed around the lens portion for deflecting a second portion of image light incident on the mounting portion away from an axis of the lens portion.

13 Claims, 1 Drawing Sheet

OPTICAL LENS AND CAMERA MODULE EMPLOYING THE SAME

TECHNICAL FIELD

The present invention generally relates to optical lenses and, more particularly, to an optical lens for an optical device such as a microscope, a camera module, a digital camera module used in a portable electronic device, or such like.

BACKGROUND

With the ongoing development of microcircuitry and multimedia technologies, digital cameras are now in widespread use. High-end portable electronic devices, such as mobile phones and personal digital assistants (PDAs), are being developed to be increasingly multi-functional. Many of these portable electronic devices are now equipped with a digital camera module. These electronic devices enable consumers to enjoy capturing digital pictures anytime and anywhere. At the same time, the need for digital picture quality has become greater and greater.

In a typical camera module, a lens module is very important to the quality of the pictures captured by the camera module. The lens module typically includes a tubular body and a plurality of lenses. Each lens has a lens portion and a mounting portion. The lens portion is located at a center of the mounting portion. The lenses are coaxially received in the tubular body. The lens portions of the plurality of lenses act together to concentrate a first portion of the image light traveling incident on the lens portions onto an image sensor to capture an image. However, a second portion of image light incident on the mounting portions is also reflected onto the image sensor by the mounting portions. As a result, the second portion of image light interferes with the first portion of image light, thereby reducing the quality of the pictures captured by the image sensor.

Therefore, a new optical lens is desired in order to overcome the above-described shortcomings.

SUMMARY

In one aspect, an optical lens includes a lens portion and a mounting portion. The lens portion is located at a center of the mounting portion. The lens portion is configured for refracting a first portion of image light incident on the lens portion. The mounting portion has a light deflecting part. The light deflecting part is formed around the lens portion for deflecting a second portion of image light incident on the mounting portion away from an axis of the lens portion.

In another aspect, a camera module includes a body, an optical lens, and an image sensor module. The optical lens is received in the body. The optical lens includes a lens portion and a mounting portion. The lens portion is located at a center of the mounting portion. The lens portion is configured for refracting a first portion of image light incident on the lens portion. The mounting portion has a light deflecting part. The light deflecting part is formed around the lens portion for deflecting a second portion of image light incident on the mounting portion away from the image sensor module. The image sensor module is received in the body and receives the first portion of image light refracted by the optical lens.

Other advantages and novel features of the embodiments will become more apparent from the following detailed description thereof when taken in conjunction with the accompanying drawings.

BRIEF DESCRIPTION OF THE DRAWINGS

Many aspects of the present optical lens can be better understood with reference to the following drawings. The components in the drawings are not necessarily drawn to scale, the emphasis instead being placed upon clearly illustrating the principles of the optical lens and its potential applications. Moreover, in the drawings, like reference numerals designate corresponding parts throughout the several views.

DETAILED DESCRIPTION OF THE EMBODIMENTS

Figure 1:
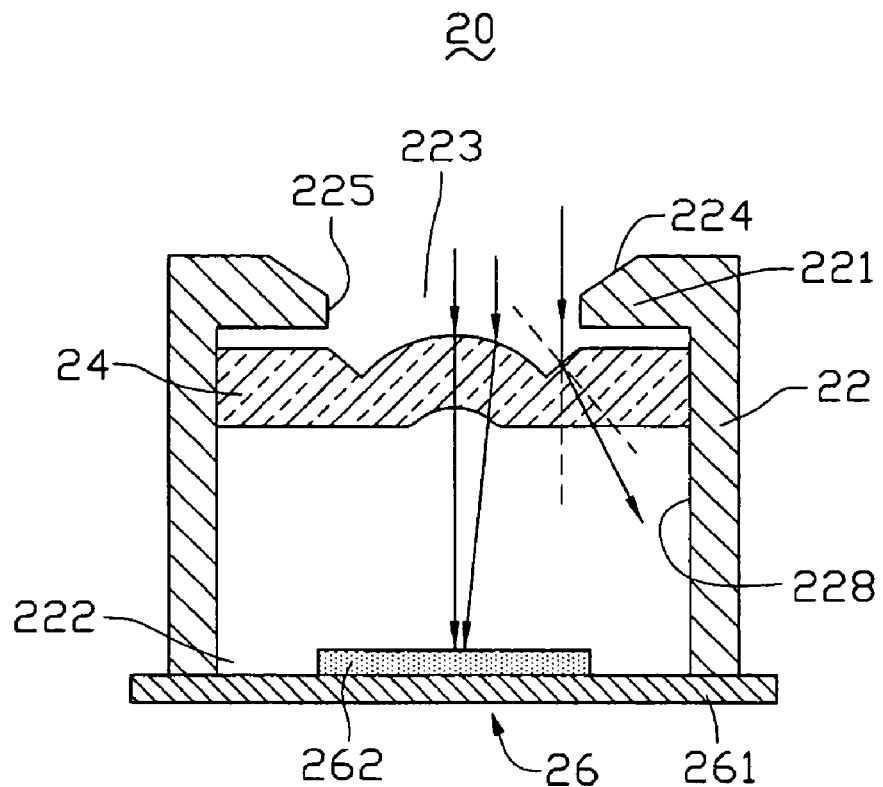
FIG. 1 is an assembled, isometric view of a optical lens with a camera module in accordance with a preferred embodiment.

Referring now to the drawings in detail, FIG. 1 shows an optical lens 24 for use with a camera module 20. The camera module 20 is taken here as an exemplary application, for the purpose of describing details of the optical lens 24 of a preferred embodiment of the present invention. It is to be understood, however, that the optical lens 24 could be suitably used in other environments (e.g. in telescope or in microscope). As such, although proving particularly advantageous when used in the camera module 20, the optical lens 24 should not be considered limited in scope solely to an intended use environment of the camera module 20. The camera module 20 includes a body 22, the optical lens 24, and an image sensor module 26. The optical lens 24 and the image sensor module 26 are received in the body 22 in that order from top to bottom.

The body 22 is a hollow cylinder in shape and has an inner surface 228. The body 22 has a half-closed end 221 and an open end 222. The half-closed end 221 is opposite to the open end 222. The half-closed end 221 defines a hole 223 in a center. The hole 223 has a Y-shaped cross section thereby forming a conical sidewall 224 and a cylindrical sidewall 225.

Figure 2:
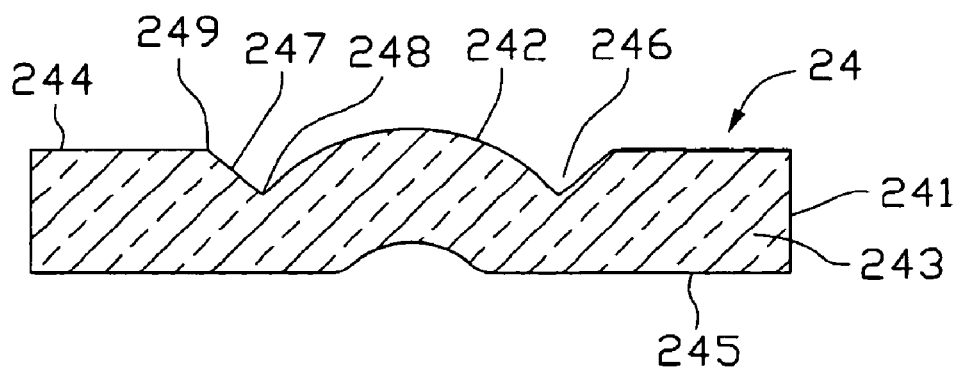
FIG. 2 is an enlarged, isometric view of the optical lens shown in FIG. 1.

Also referring to FIG. 2, the optical lens 24 is a substantially round disk in shape. A diameter of the optical lens 24 is substantially equal to an inner diameter of the body 24 so that the optical lens 24 is fully received in the body 20. The optical lens 24 has a periphery surface 241, a top surface 244, and a bottom surface 245. The top surface 244 is opposite to the bottom surface 245.

The optical lens 24 has a lens portion 242 and a mounting portion 243. The lens portion 242 is located at a center of the mounting portion 243. The lens portion 242 has an incident surface and is configured for concentrating a first portion of image light incident on the incident surface of the lens portion 242. The mounting portion 243 has a light deflecting part 246 defined at the top surface 244 of the mounting portion 243. The light deflecting part 246 is around the lens portion 242 and adjacent to the lens portion 242 thereby forming a sidewall 247. In this preferred embodiment, the light deflecting part 246 is a groove. A surface of the sidewall 247 is a conic plane.

The light deflecting part 246 is configured for deflecting a second portion of image light incident on the mounting portion 243 away from an axis of the lens portion 242. The sidewall 247 is a ring in shape and has a bottom end 248 and a top end 249. A diameter of a circle defined by the bottom end 248 is shorter than a diameter of a circle defined by the top end 249. A diameter of the cylindrical sidewall 225 of the body 22 is substantially equal to the diameter of the circle defined by the top end 249. As a result, the light deflecting part 246 can deflect all the second portion of image light incident on the mounting portion 243 away from the axis of the lens portion 242.

The image sensor module 26 is configured for receiving the first portion of image light concentrated by the lens portion 242 of the optical lens 24. The image sensor module 26 includes a base 261 and an image sensor 262. The image sensor 262 is mounted on the base 261. The open end 222 of the body 22 is mounted on the base 261 with the image sensor 262 received in the body 22.

In assembly, the optical lens 24 is inserted into the body 22 through the open end 222. The periphery surface 241 of the optical lens 24 is mounted on the inner surface 228 of the body so that the axis of the lens portion 242 of the optical lens 24 is perpendicular to a radial direction of the body 22. The open end 222 of the body 22 is mounted on the base 261 with the image sensor 262 received in the body 22. Thus the camera module 20 is assembled as shown in FIG. 1.

In use, the first portion of image light traveling through the hole 223 to the lens portion 242 is concentrated onto the image sensor 262 of the image sensor module 26. The second portion of image light incident on the mounting portion 243 is deflected away from the axis of the lens portion 242 by the light deflecting part 246, thereby away from the image sensor 262. Therefore, the second portion of image light can not reach the image sensor 262, and the quality of the picture captured by the image sensor 262 is improved.

It is to be understood that the light deflecting part 246 may be positioned at the bottom surface 245 of the mounting portion 243. The lens portion 242 may be configured for diverging the first portion of image light. The number of the optical lenses 24 may be more. The surface of the sidewall 247 may be a concave plane or a convex plane.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module comprising:
  a body, the body being a hollow cylinder in shape and having a half-closed end, the half-closed end defining a Y-shaped hole thereby forming a conical sidewall and a cylindrical sidewall;
  an optical lens received in the body, the optical lens comprising:
    a lens portion configured for refracting a first portion of image light incident on the lens portion; and
    a mounting portion having a light deflecting part, the lens portion being located at a center of the mounting portion, and the light deflecting part being formed around the lens portion; and
  an image sensor module received in the body, the first portion of image light being refracted by the optical lens to the image sensor module, and a second portion of image light incident on the mounting portion being deflected away from the image sensor module by the light deflecting part.

2. The camera module as claimed in claim 1, wherein the light deflecting part is a groove defined at a surface of the mounting portion adjacent to the lens portion thereby forming a sidewall.

3. The camera module as claimed in claim 2, wherein the sidewall is a ring in shape and has a bottom end and a top end, a diameter of a circle defined by the bottom end is shorter than a diameter of a circle defined by the top end.

4. The camera module as claimed in claim 3, wherein a diameter of the cylindrical sidewall is substantially equal to the diameter of the circle defined by the top end.

5. The camera module as claimed in claim 2, wherein the surface of the sidewall is a conic plane.

6. The camera module as claimed in claim 2, wherein the surface of the sidewall is a concave plane.

7. The camera module as claimed in claim 2, wherein the surface of the sidewall is a convex plane.

8. A camera module comprising:
  a body having a half-closed end, the half-closed end defining a hole thereby forming an inner cylindrical sidewall;
  an optical lens received in the body, the optical lens comprising:
    a lens portion configured for refracting a first portion of image light incident on the lens portion; and
    a mounting portion having a groove defined at a surface of the mounting portion adjacent to the lens portion thereby forming a sidewall, the sidewall of the being a ring in shape and having a bottom end and a top end, and a diameter of the cylindrical sidewall is substantially equal to a diameter of a circle defined by the top end; and
  an image sensor module received in the body, the first portion of image light being refracted by the optical lens to the image sensor module, and a second portion of image light incident on the mounting portion being deflected away from the image sensor module by the sidewall of the groove.

9. The camera module as claimed in claim 8, wherein a diameter of a circle defined by the bottom end is shorter than a diameter of a circle defined by the top end.

10. The camera module as claimed in claim 8, wherein the hole defined in the half-closed end is Y-shaped thereby further forming a conical sidewall.

11. The camera module as claimed in claim 8, wherein the surface of the sidewall of the groove is a conic plane.

12. The camera module as claimed in claim 8, wherein the surface of the sidewall of the groove is a concave plane.

13. The camera module as claimed in claim 8, wherein the surface of the sidewall of the groove is a convex plane.

* * * * *